(12) United States Patent
Itakura et al.

(10) Patent No.: US 6,278,873 B1
(45) Date of Patent: Aug. 21, 2001

(54) WRISTWATCH-TYPE COMMUNICATION DEVICE AND ANTENNA THEREFOR

(75) Inventors: Hitoshi Itakura, Tokyo; Tatsuo Nitta, Tanashi; Tadashi Yasuoka, Tanashi; Yūiti Hasumi, Tanashi; Nobuhiro Satoh, Tanashi, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/380,795

(22) PCT Filed: Jan. 19, 1999

(86) PCT No.: PCT/JP99/00141

§ 371 Date: Sep. 9, 1999

§ 102(e) Date: Sep. 9, 1999

(87) PCT Pub. No.: WO99/37034

PCT Pub. Date: Jul. 22, 1999

(30) Foreign Application Priority Data

Jan. 20, 1998 (JP) .................................................... 10-09016

(51) Int. Cl.$^7$ ....................................................... H04B 1/08
(52) U.S. Cl. .............................. 455/351; 455/90; 455/347
(58) Field of Search ...................................... 455/351, 575, 455/90, 344, 347, 274, 82

(56) References Cited

U.S. PATENT DOCUMENTS 3,266,042 * 8/1966 Mahoney et al. ..................... 343/742

(List continued on next page.)

FOREIGN PATENT DOCUMENTS

WO 94/24723 * 10/1994 (GB) ................................ H01Q/1/38

| | | | |
|---|---|---|---|
| 1-216603 | 8/1989 | (JP) | H01Q/9/30 |
| 4-211198 | 8/1992 | (JP) | H05K/9/00 |
| 8-84016 | 3/1996 | (JP) | H01Q/7/00 |
| 9-247006 | 9/1997 | (JP) | H04B/1/08 |

*Primary Examiner*—Daniel Hunter
*Assistant Examiner*—C. Chow
(74) *Attorney, Agent, or Firm*—Kanesaka & Takeuchi

(57) ABSTRACT

A device includes: a communication device case 2 having therein a display panel 13 supported by a support frame 12 and a circuit board 15 stacked with a battery 22 and electrically connected to the battery 22; and an antenna 6 housed in the communication device case 2, the antenna having a first conductor portion 23 formed in a ring, a second conductor portion 24 opposed to the first conductor portion 23 at a predetermined interval, and a third conductor portion 25 for electrically connecting the first conductor portion 23 and the second conductor portion 24. And a communication module assembly 3 is formed by disposing a communication device module in the antenna 6, the communication device module including the circuit board and the support frame. And the first conductor portion 23 of the antenna 6 in the communication device module assembly is positioned on a side of the circuit board 15 opposite to the support frame and outward, and the second conductor portion 24 is positioned on a side of the support frame 12 opposite to the circuit board and outward. As a result, the conductor portion of the antenna is positioned in an outermost portion of the communication device module. Therefore, the dimension of strap in the thickness direction and the dimension of the communication device case in the plane direction can be set to small values, respectively. In addition, favorable feeling of wearing the communication device can be obtained, and the size of the communication device as a whole can be made small.

13 Claims, 4 Drawing Sheets

U.S. PATENT DOCUMENTS

| | | | |
|---|---|---|---|
| 3,745,583 | * | 7/1973 | Herbert .................................. 343/742 |
| 4,321,699 | * | 3/1982 | Toyama et al. ........................ 368/255 |
| 4,419,770 | * | 12/1983 | Yagi et al. ............................. 455/301 |
| 4,737,941 | * | 4/1988 | Kamiyama et al. .................... 368/77 |
| 5,265,265 | * | 11/1993 | Hama et al. ........................... 455/220 |
| 5,504,940 | * | 4/1996 | Hahs, Jr. et al. ..................... 455/38.1 |
| 5,532,705 | * | 7/1996 | Hama .................................... 343/718 |
| 5,627,548 | * | 5/1997 | Woo et al. ............................. 342/357 |
| 5,627,552 | * | 5/1997 | Farrar et al. .......................... 343/718 |
| 5,673,054 | * | 9/1997 | Hama .................................... 343/744 |
| 5,768,217 | * | 6/1998 | Sonoda et al. ........................ 343/718 |
| 5,889,738 | * | 3/1999 | Huter ..................................... 368/220 |
| 5,926,144 | * | 7/1999 | Bolanos et al. ....................... 343/718 |

\* cited by examiner

WRISTWATCH-TYPE COMMUNICATION DEVICE AND ANTENNA THEREFOR

TECHNICAL FIELD

The present invention relates to a wristwatch-type communication device in which a conductor portion of an antenna is disposed in a position near the outermost position in a case of the communication device, and an antenna having a conductor portion formed like two loops. For example, the present invention relates to a wristwatch-type communication device suitable for use in a radio paging receiver serving as a mobile communication-device and an antenna used in this receiver.

BACKGROUND ART

In recent years, various mobile communication media become popular rapidly. In such mobile communication media, there are included automobile telephone, portable telephone, and pager (small-sized radio paging receiver). Among them, small-sized radio paging receivers are spreading widely because each of the radio receivers is small sized as a whole and the price is low.

Heretofore, as such a small-sized radio paging receiver (small-sized communication device), a wristwatch-type radio paging receiver having a coil antenna disclosed in, for example, Japanese Patent Application Laid-Open No. Hei 8-321708 is known. Furthermore, as a conventional small-sized communication device, a portable communication device having a loop antenna disclosed in, for example, Japanese Patent Application Laid-Open No. Hei 4-211198 is known.

However, the communication device disclosed in Japanese Patent Application Laid-Open No. Hei 8-321708 has a built-in coil antenna. As compared with a device having a built-in loop antenna, therefore, it has a problem of a poor receiving sensitivity and degraded communication device performance.

On the other hand, the communication device disclosed in Japanese Patent Application Laid-Open No. Hei 4-211198 has such a structure that a strap for wearing the communication device has a built-in loop antenna. When the communication device is not worn, therefore, the antenna does not take the shape of a loop, and consequently the receiving sensitivity is degraded as compared with that obtained when the communication device is worn. Thus, there is a problem that stable communication performance cannot be always ensured.

In addition, since the strap for wearing has a built-in loop antenna, the thickness of the strap becomes greater accordingly. This results in a problem that the feeling of wearing the communication device is bad and the size of the communication device as a whole becomes large.

Therefore, an object of the present invention is to provide a wristwatch-type communication device capable of enhancing its performance as a communication device, providing favorable feeling of wearing the communication device, and reducing the size of the communication device as a whole.

Another object of the present invention is to provide an antenna suitable for use in the wristwatch-type communication device of the present invention.

DISCLOSURE OF THE INVENTION

A wristwatch-type communication device of the present invention includes a communication device case having therein a display panel supported by a support frame, a battery and a circuit board stacked and electrically connected to the battery; and an antenna housed in the communication device case, the antenna having a first conductor portion formed in a ring, a second conductor portion opposed to the first conductor portion at a predetermined interval, and a third conductor portion connecting the first conductor portion and the second conductor portion electrically, and a communication module assembly is formed by disposing a communication device module in the antenna, the communication device module including the circuit board and the support frame, and the first conductor portion of the antenna in the communication device module assembly is positioned on a side of the circuit board opposite to the support frame and outward, and the second conductor portion is positioned on a side of the support frame opposite to the circuit board and outward.

An antenna of the present invention includes a first conductor portion formed in a ring, a second conductor portion opposed to the first conductor portion at a predetermined interval, and a third conductor portion for electrically short-circuiting the second conductor portion to the first conductor portion. And the third conductor portion is formed of a plurality of connecting conductors.

According to the present invention, a loop-shaped antenna is formed by the single first conductor portion, the single second conductor portion, and a plurality of third conductor portions. Since the first conductor portion and the second conductor portion are disposed in outermost positions of the communication device module, the antenna may be disposed in the communication device case in such a state that the opening of the loop is widened at maximum without interfering with electronic components.

Since the loop-shaped antenna is thus housed in the communication device case, a favorable transmission and reception sensitivity which is not changed not only when the communication device is worn on a wrist but also when the communication device is not worn, may be obtained. As a result, stable communication performance can be always be ensured.

Furthermore, since a favorable transmission and reception sensitivity can be obtained by making the opening portion of the antenna loop large, the performance as a communication device may be enhanced.

By disposing the first conductor portion and the second conductor portion in outer peripheral edge portions of the communication device module, the dimensions of the communication device case in the thickness direction and in the plane direction can be set to small values, respectively, favorable feeling of wearing the communication device may be obtained, and the size of the communication device as a whole may be made small.

BEST MODE FOR CARRYING OUT THE INVENTION

Figure 1:
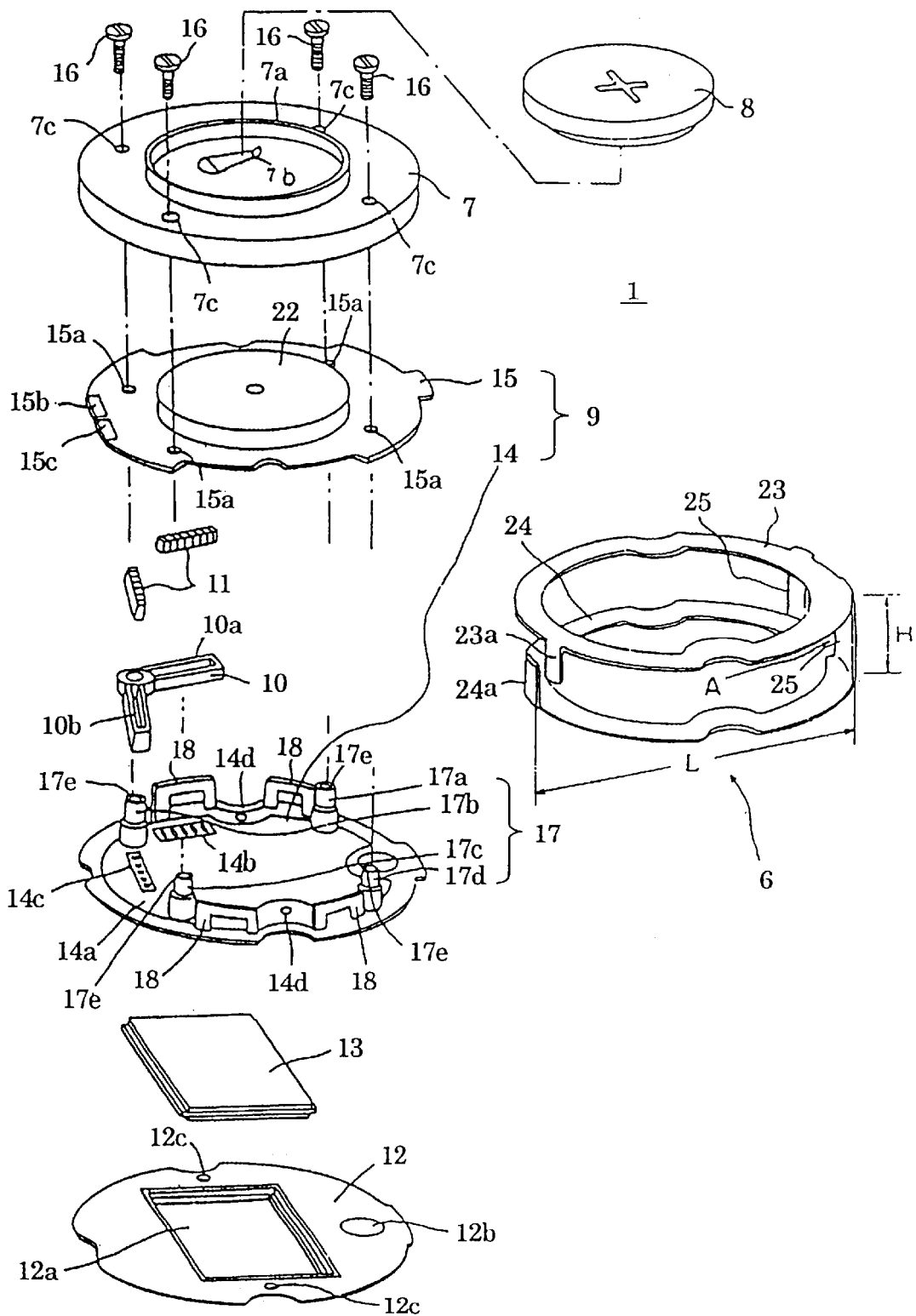
FIG. 1 is an exploded perspective view showing an embodiment of a wristwatch-type communication device according to the present invention.

Hereafter, an embodiment of the present invention will be described by referring to the drawings.

Figure 2:
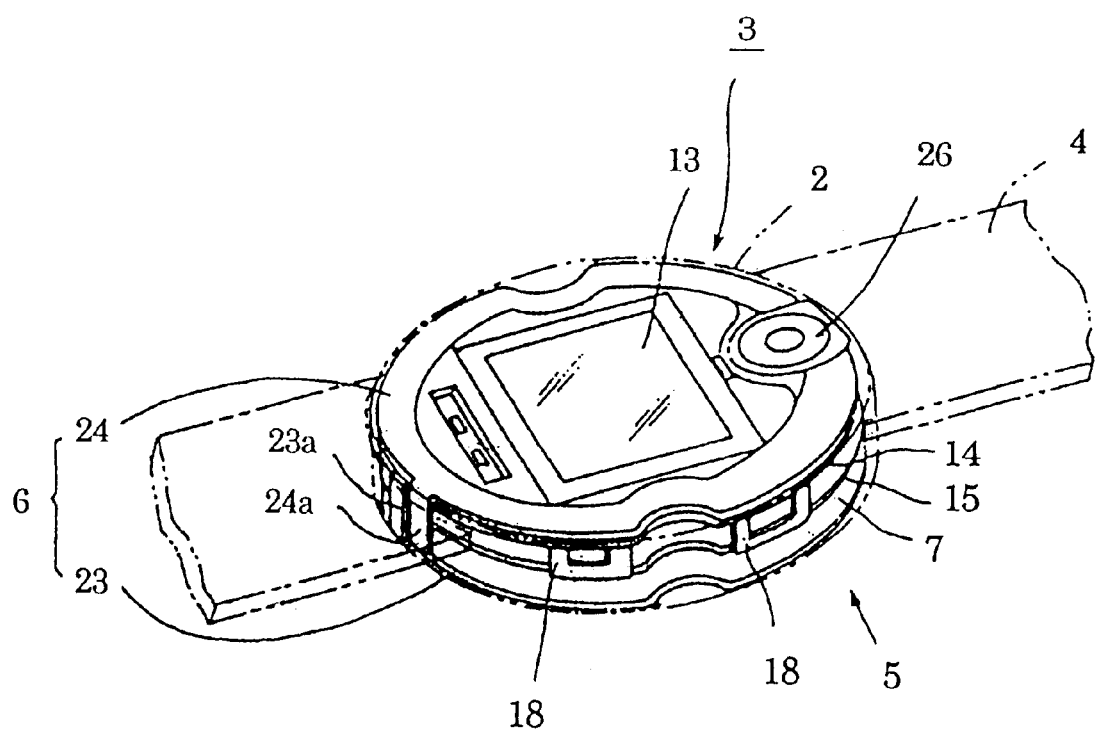
FIG. 2 is a perspective view showing an embodiment of a wristwatch-type communication device according to the present invention.

FIGS. 1 and 2 are an exploded oblique view and an assembly oblique view showing an embodiment of a wristwatch-type communication device according to the present invention, respectively.

With reference to FIGS. 1 and 2, a wristwatch-type radio paging receiver 1 serving as a wristwatch-type communication device includes a receiver case 2, a receiver module assembly 3, and a strap 4.

The receiver case 2 has at least an opening (not illustrated) for a panel. The receiver case 2 as a whole is formed of a thin cylindrical body.

The receiver module assembly 3 includes a receiver module 5 and an antenna 6. The receiver module assembly 3 is formed by disposing the receiver module 5 within the antenna 6.

The receiver module 5 includes a board support base 7, a battery 8, a circuit board 9, a rubber support frame 10, conductive rubber pieces 11, a liquid crystal panel support frame 12, and a display panel 13.

The board support base 7 has a battery housing frame 7a. The board support base 7 as a whole is formed of a circular plate. A connectable terminal 7b of the battery 8 is attached to a central part of the board support base 7 in an eccentric position thereof. In a peripheral portion of the board support base 7, four through holes 7c are formed so as to be parallel at predetermined intervals in the circumferential direction and open in the axis line direction.

The battery 8 takes the shape of a coin. The battery 8 is housed in the battery housing frame 7a of the board support base 7.

The circuit board 9 includes a display circuit board 14 opposed to the display panel 13, and a receiving circuit board 15 opposed to the display circuit board 14. The circuit board 9 is housed in the receiver case 2. A circuit portion of the circuit board 9 and a reflection noise generation portion including reflective noise generators (components) (such as a vibrator 22) are disposed in a central part of the circuit board 9. As a result, radio reflective noise generation between the antenna 6 and the reflective noise generating portion becomes small.

The display circuit board 14 is formed of a printed circuit board having a plurality of layers (four layers). On a side of the display circuit board 14 opposite to the display panel, a ground pattern layer 14a is formed so as to spread and cover a receiving circuit portion disposed on the opposed receiving circuit board 15.

As a result, electromagnetic noise emitted from the display circuit board 14 to the receiving circuit board 15 is intercepted.

In a peripheral portion of the display circuit board 14, four stepped struts 17 (17a–17d) made of metal are erected so as to be parallel at predetermined intervals in the circumferential direction and protrude in the thickness direction of the receiver. As a result, a space portion (not illustrated) for housing receiver components is secured between the circuit boards 14 and 15.

These stepped struts 17 are connected to the ground pattern layer 14a. As a result, a further wide region coupled by the stepped struts 17 is formed.

In tip portions of these stepped struts 17a–17d, screw holes 17e for board attaching are formed so as to open toward the receiving circuit board 15. Together with the board support base 7, therefore, the receiving circuit board 15 and the like are screwed to the display circuit board 14 via the stepped struts 17a–17d.

Near a base end portion of each of the stepped struts 17a–17d, a pair of connector patterns 14b and 14c which can be connected to the conductive rubber pieces 11 is formed.

These connector patterns 14b and 14c are positioned on lines connecting the strut 17a for rubber support frame attachment to other struts 17b and 17c adjacent to this stepped strut 17a, and positioned near the strut 17a for rubber support frame attachment. As a result, the conductive rubber pieces 11 are attached elastically in such a state that the deformation of the circuit boards 14 and 15 in the receiver thickness direction is minimized, and reliable connection between the circuit boards 14 and 15 is obtained.

By the way, also in the case where the connector patterns 14b and 14c are disposed on lines connecting the stepped strut 17a to the stepped struts 17b and 17c, similar effects are obtained.

Furthermore, in the peripheral portion of the display circuit board 14, two screw holes 14d for support frame attaching are formed so as to be parallel at predetermined intervals (equal intervals) in the circumferential direction. On both sides of each of the screw holes 14d for support frame attaching in the circumferential direction, springs 18 for switch return are attached so as to protrude in the board thickness direction.

Figure 3:
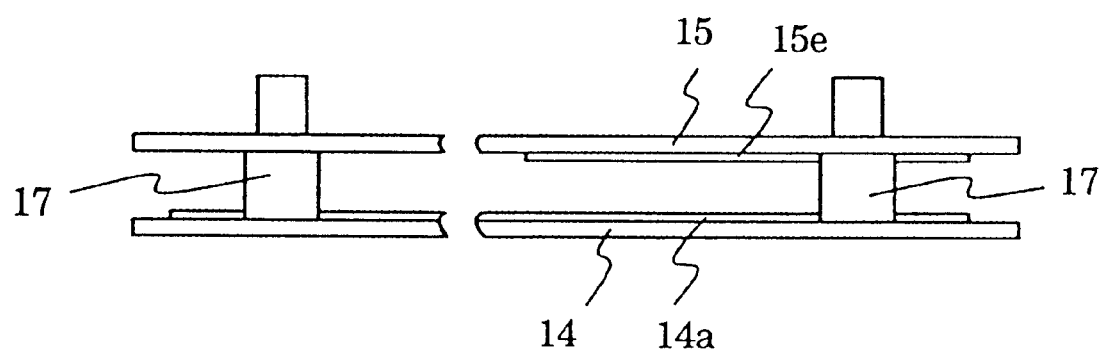
FIG. 3 is a side view showing ground layers of a receiving circuit board and a display circuit board in an embodiment of a wristwatch-type communication device according to the present invention.

On the other hand, the receiving circuit board 15 is formed of a plurality of printed board layers in the same way as the display circuit board 14. On the display panel side of the receiving circuit board 15, a ground pattern layer 15e connected to the ground pattern layer 14a of the display circuit board 14 via the struts 17 are formed as shown in FIG. 3. As a result, a wider ground region is formed. In a peripheral portion of the receiving circuit board 15, screw insertion holes 15a corresponding to the screw holes 17e for board attaching are formed.

Figure 4:
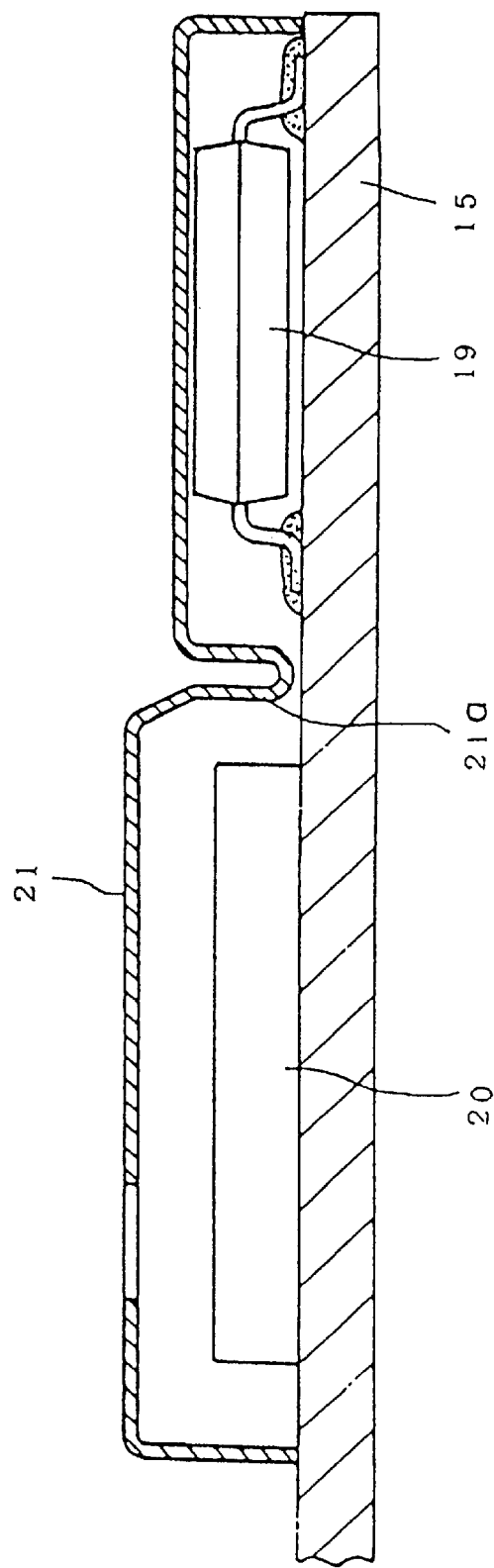
FIG. 4 is a sectional view showing a shield box and circuit elements using an embodiment of a wristwatch-type communication device according to the present invention.

On the display panel side (display circuit board side) of the receiving circuit board 15, a PLL integrated circuit element 19 and a VCO circuit element 20 for forming a synthesizer are mounted as shown in FIG. 4. As a result, it becomes possible to receive radio waves of a plurality of frequencies.

Furthermore, on the display panel side of the receiving circuit board 15, a shield box 21 covering the circuit elements 19 and 20 is disposed. As a result, electromagnetic noise emitted from the circuit elements 19 and 20 in the shield box 21 is intercepted.

In the shield box 21, a partition portion 21a existing between the circuit elements 19 and 20 is formed so as to be bent. Even if the circuit elements 19 and 20 are disposed so as to be close to each other, electromagnetic noise from the circuit elements 19 and 20 is intercepted each other by this partition portion 21a. Furthermore, since the partition portion 21a is formed by bending the shield box 21, forming a single shield plate is possible. Accordingly, gap portions are reduced, the shield effect being enhanced.

In a central part of a side of the receiving circuit board 15 opposite to the display panel, a vibrator 22 for communicating reception and the like is attached. This vibrator 22 generates reflection noise. In a peripheral portion of side of the receiving circuit board 15 opposite to the panel, two terminal patterns 15b and 15c are formed to solder feeder terminals (described later) of the antenna 6 thereto.

The antenna 6 has a first conductor portion 23, a second conductor portion 24, and a third conductor portion 25. The antenna 6 is disposed within the receiver case 2. In this antenna 6, half of a circumference of each of the first conductor portion 23 and the second conductor portion 24 is set to L, and a dimension between the first conductor portion 23 and the second conductor portion 24 is set to H.

The first conductor portion 23 is disposed on outer peripheral edge of a side of the board support base 7 opposite to the support frame. The first conductor portion 23 is formed entirely of a ring-shaped conductor.

The second conductor portion 24 is disposed on an outer peripheral edge of a side of the liquid crystal panel support frame 12 opposite to the board support base. The second conductor portion 24 is formed entirely of a conductor plate taking a nearly C shape when viewed from above.

The third conductor portion 25 has two connecting conductors formed at both ends of the second conductor portion 24 to electrically short-circuit the first conductor portion 23 with the second conductor portion 24.

Between the two connecting conductors of the third conductor portion 25 located at both ends of the second conductor portion 24, a space portion A housing a buzzer 26 for communicating reception and the like is formed. As a result, the buzzer 26 is positioned in the space portion A formed between the two connecting conductors of the third conductor portion 25. By reduction of the dimension in the receiver thickness direction, the battery housing space is secured in the antenna 6. Furthermore, as a result, the two connecting conductors of the third conductor portion 25 become the same potential. Even if electromagnetic noise is generated by driving the buzzer 26, therefore, influence exerted upon the entire antenna 6 is minimized.

Furthermore, in the antenna 6, feeder terminals 23a and 24a are formed integrally with the antenna 6 so as to be disposed opposite to the third conductor portion 25 in the circumferential direction and connected to the terminal patterns 15b and 15c.

The rubber support frame 10 has rubber filling and housing portions 10a and 10b corresponding to the connector patterns 14b and 14c. The rubber support frame 10 is mounted on the stepped struts 17b.

The conductive rubber pieces 11 are made of rubber with wires. The conductive rubber pieces 11 are elastically mounted on the rubber filling and housing portions 10a and 10b of the rubber support frame 10 disposed between the circuit boards 14 and 15. The conductive rubber pieces 11 are connected to the connector patterns 14b and 14c on the display circuit board 14 and connector patterns (not illustrated) on the receiving circuit board 15.

The liquid crystal panel support frame 12 has an opening 12a for housing the panel and an opening 12b for inserting the buzzer therein. The liquid crystal panel support frame 12 is housed in the receiver case 2, and fixed to the display circuit board 14 by fixture screws (not illustrated). In a peripheral portion of the liquid crystal panel support frame 12, screw insertion holes 12c corresponding to the support frame attaching screw holes 14d of the display circuit board 14 are formed.

The display panel 13 is held in the panel housing opening 12a of the liquid crystal panel support frame 12.

The strap 4 is formed of two strip-shaped strap elements, and attached to outer peripheral faces of the receiver case 2.

In the wristwatch-type radio paging receiver having such a configuration, the antenna 6 is housed in a loop form in an outermost portion of the receiver module 5, and the antenna 6 secures the maximum space within the receiver case 2.

In this case, the aperture area of the antenna determining the gain of the antenna 6 becomes large. In other words, since the projection length dimension of the first conductor portion 23 and the second conductor portion 24, and the dimension between the first conductor portion 23 and the second conductor portion 24 in the receiver thickness direction are L and H, respectively, the aperture area S (S=L×H) of the antenna represented by L×H can be made large.

In loop antennas having a subminiature size, it is the most effective means in raising the receiving sensitivity to increase the antenna aperture area.

In the present embodiment, therefore, a favorable receiving sensitivity can be obtained not only when the receiver is worn but also when the receiver is not worn. In addition, the dimension of the strap 4 in the thickness direction and the dimension of the receiver case 2 in the plane direction can be set to small values, respectively.

In the present embodiment, the third conductor portion 25 is formed of two connecting conductors. However, the present invention is not limited to this.

In the present embodiment, the communication device is a radio paging receiver for conducting one-way communication. However, the present invention is not limited to this, but the present invention is also applicable to other communication devices for conducting two-way communication in the same way as the embodiment.

Industrial Applicability

As heretofore described, the wristwatch-type communication device and antenna according to the present invention can be utilized in communication devices such as pagers and portable telephones as well as wrist watches having some communication function.

What is claimed is:

1. A wristwatch-type communication device, comprising:
 a case,
 an antenna housed in the case and including a first conductor portion having a generally ring shape; a second conductor portion opposed to and spaced apart from the first conductor portion to form an internal space therebetween, said second conductor portion having a generally ring shape, a space portion for housing a component therein and interrupting the second conductor portion, and end portions sandwiching the space portion; a third conductor portion connected between the first and second conductor portions and having two connecting conductors connected to the end portions of the second conductor portion for electrically connecting the first and second conductor portions; a first feeder terminal connected to the first conductor portion and; a second feeder terminal connected to the second conductor portion, and
 a support frame, a display panel supported by the support frame, a battery, and a circuit board stacked to the battery and electrically connected to the battery and the first and second feeder terminals, said support frame and circuit board being disposed in the internal space between the first and second conductor portions so that one of the first and second conductor portions is positioned on a side of the circuit board opposite to the support frame and outward thereof, and the other of the first and second conductor portions is positioned on a side of the support frame opposite to the circuit board and outward thereof.

2. A wristwatch-type communication device according to claim 1, wherein said first and second feeder terminals being positioned at a side opposite to the connecting conductors.

3. A wristwatch-type communication device according to claim 1, wherein the battery and the circuit board are held in the case by a board support base.

4. A wristwatch-type communication device according to claim 1, wherein a circuit portion and reflective noise generators are disposed near a central part of the circuit board.

5. A wristwatch-type communication device according to claim 1, wherein the circuit board has a display circuit board and a communication circuit board disposed in parallel at a predetermined interval in a thickness direction of the communication device case, and a ground pattern for intercepting noise applied to the communication circuit board is formed on the display circuit board.

6. A wristwatch-type communication device according to claim 5, wherein a plurality of struts are disposed between the display circuit board and the communication circuit board in parallel at predetermined intervals in a circumferential direction.

7. A wristwatch-type communication device according to claim 6, wherein the struts are erected on one of the display circuit board and the communication circuit board, and screw hole is formed in each of the struts so as to open toward the other of the display circuit board and the communication circuit board.

8. A wristwatch-type communication device according to claim 6, wherein the struts comprise metal struts, and the struts are connected to the ground pattern of the display circuit board.

9. A wristwatch-type communication device according to claim 6, wherein conductive rubber pieces for board connection are elastically mounted between the display circuit board and the communication circuit board, and the conductive rubber pieces are disposed on lines each connecting two adjacent struts among the struts or near the lines.

10. A wristwatch-type communication device according to claim 7, wherein each of the conductive rubber pieces is disposed near one of the struts.

11. A wristwatch-type communication device according to claim 1, wherein a shield box covering a plurality of circuit components is disposed on the circuit board, and a partition portion existing between two circuit elements adjacent to each other included in the circuit elements is formed by bending a part of the shield box.

12. An antenna comprising:

a first conductor portion having a generally ring shape, a second conductor portion opposed to and spaced apart from the first conductor portion to form an internal space therebetween, said second conductor portion having a generally C shape when viewed from above, and a third conductor portion formed of two connecting conductors, said two connecting conductors being coupled to ends of the second conductor portion in a peripheral direction to electrically connect the first and second conductor portions.

13. An antenna according to claim 12, wherein said first conductor portion includes a first feeder terminal, and the second conductor portion includes a second feeder terminal, said first and second feeder terminals connecting the antenna to other component.

\* \* \* \* \*